(12) United States Patent
 Lindquist et al.

(10) Patent No.: US 10,609,670 B2
(45) Date of Patent: *Mar. 31, 2020

(54) METHOD AND SYSTEM FOR LOCATING A POSITION OF A MOVABLE DEVICE

(71) Applicant: Combain Mobile AB, Lund (SE)

(72) Inventors: Björn Martin Gunnar Lindquist, San Jose, CA (US); Anders Mannesson, Malmö (SE); Karl Erik Åström, Lund (SE)

(73) Assignee: COMBAIN MOBILE AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/927,828

(22) Filed: Mar. 21, 2018

(65) Prior Publication Data
US 2019/0297592 A1  Sep. 26, 2019

(51) Int. Cl.
 *H04W 4/02* (2018.01)
 *H04W 4/029* (2018.01)
 (Continued)

(52) U.S. Cl.
 CPC .......... *H04W 64/00* (2013.01); *G01S 5/0236* (2013.01); *H04W 4/33* (2018.02); *G01S 5/14* (2013.01)

(58) Field of Classification Search
 CPC ....... H04W 4/00–046; H04W 4/20–23; H04W 4/30–38; H04W 4/50; H04W 4/70; H04W 4/80
 See application file for complete search history.

(56) References Cited

U.S. PATENT DOCUMENTS

| 7,397,424 B2 | 7/2008 | Houri |
| 8,369,264 B2 | 2/2013 | Brachet et al. |

(Continued)

FOREIGN PATENT DOCUMENTS

| EP | 3 093 633 A1 | 11/2016 |
| WO | WO 2010/059934 | 5/2010 |

(Continued)

OTHER PUBLICATIONS

European Search Report dated May 16, 2018 corresponding to European Application No. EP 17211019.9.

(Continued)

*Primary Examiner* — San Htun
(74) *Attorney, Agent, or Firm* — Knobbe Martens Olson & Bear, LLP

(57) ABSTRACT

A method in a movable device for locating or positioning of the movable device within an environment comprises: receiving, from an external unit, a central environment model; determining distance-dependent measurements for one or more positions of the movable device; determining a location of the movable device based on the received central environment model and the determined distance-dependent measurements, said determining comprising: forming a local environment model defining estimated locations of the wireless transmission sources and of the one or more positions of the movable device, wherein the estimated locations of the wireless transmission sources in the local environment model are updated in relation to the central environment model, wherein the updated estimated locations of the wireless transmission sources and the estimated locations of the one or more positions of the movable device are set based on a calculated error of the local environment model in relation to the determined distance-dependent measurements.

15 Claims, 5 Drawing Sheets

(51) Int. Cl.
*H04W 64/00* (2009.01)
*H04W 4/33* (2018.01)
*G01S 5/02* (2010.01)
*G01S 5/14* (2006.01)

(56) References Cited

U.S. PATENT DOCUMENTS

| | | | |
|---|---|---|---|
| 8,983,493 B2 | 3/2015 | Brachet et al. | |
| 9,008,685 B1 | 4/2015 | Gold et al. | |
| 9,395,190 B1 | 7/2016 | Young et al. | |
| 2005/0186966 A1* | 8/2005 | Belcea | G01S 5/0252 455/456.1 |
| 2005/0285792 A1 | 12/2005 | Sugar et al. | |
| 2007/0082677 A1* | 4/2007 | Donald Hart | H04W 16/18 455/456.1 |
| 2007/0149216 A1* | 6/2007 | Misikangas | H04W 64/00 455/456.1 |
| 2010/0135178 A1* | 6/2010 | Aggarwal | G01S 5/0205 370/252 |
| 2010/0178934 A1* | 7/2010 | Moeglein | G01S 5/0263 455/456.1 |
| 2011/0269479 A1* | 11/2011 | Ledlie | G01S 5/0252 455/456.1 |
| 2014/0200037 A1* | 7/2014 | Venkatraman | G01C 21/005 455/456.6 |
| 2014/0278060 A1 | 9/2014 | Kordari et al. | |
| 2014/0342755 A1 | 11/2014 | Youssef et al. | |
| 2015/0172872 A1 | 6/2015 | Alsehly et al. | |
| 2015/0237595 A1* | 8/2015 | Le Grand | G01S 5/0252 370/338 |
| 2016/0007179 A1* | 1/2016 | Kim | G08B 7/066 455/404.1 |
| 2017/0276760 A1 | 9/2017 | Alsehly et al. | |

FOREIGN PATENT DOCUMENTS

| | | |
|---|---|---|
| WO | WO 2011/077166 A1 | 6/2011 |
| WO | WO 2012/107268 | 8/2012 |

OTHER PUBLICATIONS

Extended European Search Report dated Aug. 27, 2019 in related European Application No. 19163867.5, filed Mar. 19, 2019, in 9 pages.

* cited by examiner

METHOD AND SYSTEM FOR LOCATING A POSITION OF A MOVABLE DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates, in general, to a method and a computer program for locating or positioning a movable device within an environment.

Description of the Related Art

A positioning system enables a movable device to determine its position/location, and makes the position of the device available for position-based services such as navigating, tracking, or monitoring, etc. The most widely used positioning system is the Global Positioning System (GPS). While providing very good and accurate outdoor location, there are some drawbacks with GPS. For small and low cost battery operated electronic devices, GPS is too expensive and draws too much power. GPS also cannot be deployed for indoor use, because the required close to line-of-sight transmission between receivers and satellites is not possible in an indoor environment.

In EP 3093683, a method for generating a model of an environment enabling positioning within the environment is disclosed. The method comprises receiving a plurality of distance-dependent measurements, taken at different positions of the movable device, and receiving information relating to a plurality of geographic positions. The method comprises forming a model, wherein the model defines movable device positions and source positions. A model error is iteratively reduced, wherein the model error relates the model to the distance-dependent measurements and the geographic positions. The method facilitates a self-improving model where the model may be continuously or periodically re-generated.

However, use of the method may be improved and the localization of a mobile device may be performed in a more effective manner.

SUMMARY OF THE INVENTION

It is an object of the invention to enable a simple and robust method and a computer program for enabling locating or positioning of a mobile device within an environment. It is a further object of the invention to enable providing an accurate locating or positioning of a mobile device, while having limited requirements on a communication with a central device for modelling the environment.

These and other objects of the invention are at least partly met by the invention as defined in the independent claims. Preferred embodiments are set out in the dependent claims.

According to a first aspect of the invention, there is provided a method in a movable device for locating or positioning of the movable device within an environment, wherein the movable device is configured for wireless communication, said method comprising:

receiving, from an external unit, a centrally determined environment model, said model defining least actual and/or estimated locations of wireless transmission sources;

determining distance-dependent measurements for one or more positions of the movable device, wherein each of said distance-dependent measurements provides information relating to a distance between the movable device and a wireless transmission source;

determining a location of the movable device based on the received centrally determined environment model and the determined distance-dependent measurements for one or more positions of the movable device, said determining comprising:

forming a locally determined environment model, said model being updated in relation to the centrally determined environment model and defining at least estimated locations of the wireless transmission sources and estimated locations of the one or more positions of the movable device, wherein the locally determined environment model is updated based on a calculated error of the locally determined environment model in relation to the determined distance-dependent measurements for the one or more positions of the movable device.

An environment model may be determined by means of a central unit receiving information from a plurality of different devices, such as movable devices being moved through the environment while gathering information. Such a central unit receiving information from a plurality of devices may then form a well-defined environment model based on a large amount of information. The environment model may be used for locating or positioning of devices which are present in the environment, e.g. by the devices sending information to the central unit, whereby the central unit may calculate a location of the device and return information of the location to the device. The sending of information to the central unit may also allow continuous updating and improvement of the environment model based on receipt of new information from devices.

It is an insight of the invention that locating or positioning of mobile devices using a centrally determined environment model may require extensive communication between the mobile device and an external unit. The communication between the mobile device and the central unit may also be power-consuming, which may be disadvantageous for a small mobile device with a limited battery capacity.

The inventors have therefore realized that the movable device may be configured to receive a centrally determined environment model from an external unit. The movable device may thus use the centrally determined environment model for locating or positioning of the movable device within the environment. However, according to the present invention, it is also realized that the movable device may use the centrally determined environment model and, based on distance-dependent measurements, form a locally determined environment model which may be a more accurate representation of the environment. The centrally determined environment model defines actual and/or estimated locations of wireless transmission sources which may be taken as a starting point when the locally determined environment model is created. The invention thus makes it possible for the movable device to make use of a centrally determined environment model in order to form a locally determined environment model, wherein the movable device may be positioned simultaneously with updating of locations of wireless transmission sources. Thus, the movable device need not consider the locations of the wireless transmission sources as true positions, but may rather determine its most likely position, while also allowing updating the locations of the wireless transmission sources.

Furthermore, the invention may allow a movable device to perform locating or positioning while reducing a required amount of communication between the movable device and a central unit. The central unit may have more processing power and may receive information from a number of movable devices enabling forming of a high quality model of the environment. However, in order to take advantage of the high quality model, the movable device may need to send information of distance-dependent measurements to the central unit for allowing the central unit to position the movable device. This may require frequent communication, which may be power-consuming. As the movable device may often be battery operated, limiting power consumption may therefore be desirable.

On the other hand, if the movable device receives an environment model from the central unit, the movable device may be able to position itself in the environment model. By allowing the movable device to determine a locally determined environment model without need of communicating with the central unit, the movable device may be able to provide an accurate locating or positioning, which may take into account that the centrally determined environment model may not be entirely correct, while the power consumption of the movable device may still be smaller than if the movable device would transmit measurements to the central unit and receive its positions from the central unit.

Further, since the movable device may not need to communicate frequently with the central unit, the locating or positioning of the movable device may not be significantly affected by an unreliable communication link between the movable device and the central unit. Once the centrally determined environment model is received, the movable device may be able to position itself without need of being able to communicate with the central unit.

Also, if a large number of movable devices are to be supported for locating or positioning of the movable devices, a great processing power of the central unit may be needed for supporting the communication with movable devices and calculating locations for the movable devices. This may require the central unit being implemented by a large number of physical servers. Thus, by distributing centrally determined environment models to the movable device(s), the requirements of processing power of the central unit may decrease.

Furthermore, the invention makes it possible for movable devices to perform modelling. With a ready-made model to build on, the centrally determined environment model, it may be possible for the movable device to find its estimated position through modelling. Estimated positions found through modelling rather than equation solving, like e.g. in trilateration positioning, may be more accurate as the modelling allows for fitting parameters, like the estimated locations of wireless transmission sources, to be altered rather than taking them for certain.

Depending on processing power of the movable device, different levels of complexity in forming the locally determined environment model may be used. For instance, a movable device with a relatively large processing capacity, such as a mobile phone, may be able to perform advanced computations in forming of the locally determined environment model. Thus, the movable device may allow many fitting parameters to vary, which may allow for a very accurate locally determined environment model to be formed.

However, also a simple movable device, which may not possess an advanced processing unit, may be able to perform some improvements on the centrally determined environment model. The simple movable device, e.g. an Internet of Things (IoT) device, may for example be able to form a locally determined environment model, wherein wireless transmission sources may be added or removed from the centrally determined environment model in order to update and improve the model.

Furthermore, the invention may facilitate dynamical changes in the locally determined environment model if the wireless environment has significantly changed since the centrally determined environment model was created. This allows the movable device to accurately position itself more quickly. The movable device may when entering a building receive, from an external unit, a centrally determined environment model of the wireless transmission sources in the building. The movable device may thereby immediately start to orient itself in the building without having to build its own model first. However, the movable device is not bound to accept the received model as an absolute truth. It may continue to build on the model through distance-dependent measurements also during periods when it, e.g. for power conserving reasons, is not communicating with the external unit. The movable device may thereby account for changes in the environment, such as e.g. a wireless transmission source being moved, added or removed or a new bookshelf being installed which changes the RF propagation properties, and find its position accurately even if the last centrally determined environment model it received is outdated and/or inaccurate.

For instance, the forming of the locally determined environment model may allow identifying of wireless transmission sources which are significantly moved in the environment or completely removed. This may for instance allow handling of movable transmission sources, such as a mobile phone forming an access point, in order to remove such wireless transmission sources from the locally determined environment model when the environment has changed.

As used herein, the term "distance-dependent measurement" should be construed as a measurement that gives some indication of a distance, even though it may not measure the distance directly. Rather, the measured quantity may be a quantity that is dependent on distance in some way. The measured quantity need not even be directly proportional to the distance and may even be non-linearly related to the distance. As further described below, the distance measurement may e.g. be based on a received power of a signal, i.e. a signal strength such as received signal strength indicator (RSSI) measurements, or be based on a time of travel of a signal between a source and a receiving unit, such as round trip time (RTT) measurements or time difference of arrival (TDOA) measurements. Also, for the use of the distance-dependent measurement in determining of distance-dependent errors, a non-linear scale, such as a logarithmic scale, may be used. Thus, the distance-dependent measurement may e.g. be a logarithmic value of a distance-dependent quantity. This also implies that for locations where the signal strength is high, the transmission source can be accurately located if a receiver (movable device) location is known.

The model of the environment may define the environment from the point of view of the type of information that is gathered to generate the model. Thus, where RF signals are used for distance-dependent measurements, the model of the environment represents RF signals that are emitted by the plurality of sources.

The sources may be any type of device that transmits a signal that may be received by a receiving unit. It may be particularly advantageous to use sources that are already in extensive use and placed in the environment to be modeled. In this regard, sources may therefore be WiFi access points or Bluetooth beacons that are already frequently used. Of course, several different types of sources may be simultaneously used as input to the model, including ultra wideband (UWB) and/or ultrasound sources. Also, base stations, such as Long-Term Evolution (LTE) pico base stations and 5G base stations may constitute sources.

The movable device may be any type of device that is able to receive a signal transmitted by the source. It could be a mobile phone, a computer, such as a laptop, a TV, a refrigerator, or other processing devices. However, it may also be a simple device having a receiver. With the dawning of Internet of Things, it may be contemplated that such a receiver may be installed in any type of device, such as bikes, lighting devices, garbage cans, surveillance systems, or domestic appliances. Thus, the movable device need not necessarily constitute a device, which normally is moved, but may rather relate to a device which may be moved without excessive effort but may in normal use be stationary. Thus, the movable device could be a domestic appliance, which from time to time determines its position in order to establish whether it has moved or not.

The terms "centrally determined environment model" and "locally determined environment model" should not be construed as necessarily defining a scope or size of the model. Rather, the "centrally determined environment model" may be a model of the environment which may be formed by a central unit, which may be central in the sense that it may receive input from a plurality of movable devices and which may determine the centrally determined environment model based on input from such plurality of movable devices. The "locally determined environment model" on the other hand may be formed locally in the movable device.

In one embodiment, the centrally determined environment model and/or the locally determined environment model may define actual and/or estimated locations of wireless transmission sources in terms of defining geographical positions of wireless transmission sources, such as defining spatial coordinates of the wireless transmission sources. The updating of the locally determined environment model may for instance add or remove a wireless transmission source from the model or move a position of a wireless transmission source both horizontally and/or vertically.

In another embodiment, the centrally determined environment model and/or the locally determined environment model may define actual and/or estimated locations of wireless transmission sources in terms of estimated distance-dependent measurement results based on geographical positions of the wireless transmission sources. The estimated distance-dependent measurement results may for instance be estimated received power of a signal, i.e. a signal strength, from a wireless transmission source being mapped for different locations in the environment. The estimated distance-dependent measurement results may be based on an underlying information of geographical positions of the wireless transmission sources. The updating of the locally determined environment model may for instance remove a wireless transmission source from the environment model, add a wireless transmission source by representing an estimated location of the added wireless transmission source in terms of estimated distance-dependent measurement results within the environment, or move a wireless transmission source by representing an estimated location of the moved wireless transmission source in terms of updated estimated distance-dependent measurement results within the environment. The adding, removing or moving of a wireless transmission source may also include updating underlying information of geographical positions of the wireless transmission sources.

The updating of the locally determined environment model may alter, add or remove any information of the centrally determined environment model. The locally determined environment model may be based on the centrally determined environment model and may use the distance-dependent measurements for the one or more positions of movable device as additional information for allowing the environment model to be updated.

It should be realized that the environment model may also take any other information, such as any observations or measurements made in the environment, into account in updating of the environment model. Also, manually input information may form observation or measurement information that may be taken into account in updating of the environment model. For instance, manual input may provide information of a floor in a building in which the movable device is located or information of manually determined location of the movable device or a wireless transmission source within the environment. Thus, the movable device may make measurements, e.g. using any sensor in the movable device, or receive observations, whereby such measurements and observations may be included in updating of the environment model.

The centrally determined environment model may comprise actual locations of the wireless transmission sources. This may be achieved e.g. by the centrally determined environment model being based on information of manual determination of exact locations of the wireless transmission sources. The centrally determined environment model may alternatively comprise estimated locations of the wireless transmission sources, e.g. by the centrally determined environment model being based on measurements in the environment which may be used for calculating estimated locations. It should also be realized that the centrally determined environment model may comprise actual locations for a subset of the wireless transmission sources and estimated locations for another subset of the wireless transmission sources.

Further, the centrally determined environment model and/or the locally determined environment model may comprise additional information of the environment (in addition to the actual and/or estimated locations of wireless transmission sources in the environment). Such additional information may be used for improving locating or positioning using the environment model and may improve reliability of the environment model. For instance, the additional information may include a RF damping coefficient in (parts) of the environment, such as a damping coefficient between floors of a building. Further, the additional information may include locations of walls in the environment and information of RF damping coefficients of the walls. Also, the additional information may provide indications of placements of elevators and stairs in a building or other static information of the environment, such that the information may help determining of a reliable and correct environment model.

According to an embodiment, the updating of the locally determined environment model in relation to the centrally determined environment model may involve estimated locations of one or more of the wireless transmission sources being updated in relation to actual and/or estimated locations of wireless transmission sources of the centrally determined environment model. The updating of the locally determined environment model may also or alternatively involve estimated locations of wireless transmission sources which are not present in the centrally determined environment model and/or removing wireless transmission sources from the centrally determined environment model.

Although advantages of the invention are mainly described for indoor environments, it is to be understood that the method and system also works outdoor. It may for instance be of use for devices that cannot use GPS or similar techniques.

In one embodiment the centrally determined environment model comprises estimated accuracies of the actual and/or estimated locations of the wireless transmission sources. Such accuracies may be of value when updating the locally determined environment model. The locally determined environment model may be iteratively refined, wherein a number of fitting parameters, e.g. the estimated locations of the wireless transmission sources, are changed iteratively with the purpose of reducing the calculated error of the locally determined environment model. Accuracies of the actual and/or estimated locations of the wireless transmission sources may be taken into consideration when deciding which fitting parameters should be changed and by how much. The movable device may thereby form a more accurate locally determined environment model if it has access to accuracies of the actual and/or estimated locations of the wireless transmission sources in the centrally determined environment model.

In one embodiment the centrally determined environment model is a subset of one or more models in the external unit. The movable device may receive only a subset tailored to its needs. The movable device may thereby save power and data processing effort by e.g. reducing the communication with the external unit to avoid unnecessary communication. Further, the centrally determined environment model may provide a model of a large environment, whereas the movable device may only need a subset defining a model of the environment in immediate vicinity of the movable device, such as a building in which the movable device is present.

The central unit may comprise a plurality of separate environment models, each representing a different geographical area, such as each centrally determined environment model representing a building or a floor of a building. The centrally determined environment model received by the movable device may thus be the environment model of the central unit applying to a specific area, such as a building, in which the movable device is present.

A model in the central unit may also comprise a large amount of information of a specific area, such as information of RF damping factors and information of locations of structures, such as stairs or walls, in the environment. The centrally determined environment model received by the movable device may thus comprise a subset of the information of a specific area as available to the central unit. For instance, the information of locations of structures may not be needed by the movable device. Further, the movable device may have such limited processing power as to not be able to take all information about an environment into account and may therefore only receive a subset of information which the movable device may utilize in forming of the locally determined environment model.

In one embodiment the calculated error of the locally determined environment model is based on a calculated weighted contribution of errors, wherein each error is based on a difference between a feature defined by the locally determined environment model and a corresponding measurement.

It should be realized that the movable device may determine a number of different types of observations of the environment in terms of measurements. These measurements may be used in determining of the locally determined environment model. Thus, the locally determined environment model may try to minimize an error between the model and the observations, where different weights may be given to different types of features and corresponding measurements such that the measurements may be given a weight depending e.g. on reliability of the measurement.

Although a plurality of different types of measurements may be used, it should be realized that it is not necessary to use a plurality of different types of measurements when forming the locally determined environment model and only a single type of measurements may be used, such as the distance-dependent measurements.

Features may be extracted from the locally determined environment model such that the features may be compared to a measurement for determining an error. For instance, a step counter of the movable device may provide a measurement of a distance between two subsequent positions of the movable device. Then, a corresponding distance as modelled by the locally determined environment model may be extracted and compared to the measurement of the step counter for determining an error between the locally determined environment model and the corresponding measurement.

The forming of the locally determined environment model may strive to minimize a combined error formed by the weighted contribution of errors. However, it should also be realized that the locally determined environment model need not necessarily minimize the combined error. For instance, an acceptable threshold may be set, such that computation of the locally determined environment model may be terminated as soon as the combined error is below the acceptable threshold.

According to an embodiment, the errors include source location errors, which are based on a difference between the actual and/or estimated locations of wireless transmission sources of the centrally determined environment model and the updated estimated locations of the wireless transmission sources of the locally determined environment model. Thus, if the locations of wireless transmission sources of the centrally determined environment model are considered as relatively reliable, changes, locations of the wireless transmission sources may be handled as an error which is taken into account when forming the locally determined environment model.

According to an embodiment, the errors include distance-dependent errors, which are based on a difference between a distance-dependent value based on an updated estimated location of a wireless transmission source and an estimated location of the movable device and the distance-dependent measurement representing a distance between the wireless transmission source and the movable device. Thus, distances between locations of the movable device and transmission sources, as modelled by the locally determined environment model, may be compared to observations in the form of the distance-dependent measurement, in order to ensure that the locally determined environment model defines locations of the wireless transmission sources and locations of the movable device when making distance-dependent measurements as correctly as possible.

An advantage of basing the calculated error of the local environment model on a weighted contribution of source location errors and distance-dependent errors is that the forming of the local environment model can account for some changes being more probable than others. This may save time and power for the movable device and may ensure that an accurate local environment model is formed.

In one embodiment the distance-dependent measurements are sequentially determined for a plurality of positions of the movable device while the movable device is moved in the environment, wherein the forming of the locally determined environment model is based on the determined distance-dependent measurements for a defined number of most recent positions among the plurality of positions.

In doing so the movable device improves the basis for updating the locally determined environment model. Several measurements taken at the same position may hold little value for improving the estimates of the locations of the wireless transmission sources while several measurements taken at different positions, during movement, may hold a large value. Measurements taken at different positions may ensure that information of different measurements is not correlated or correlated to a small degree so that the measurements in combination gather a large amount of information about the environment and may therefore give rise to better accuracy in the locally determined environment model.

Further, by using a defined number of most recent positions, the locally determined environment model may be based on most recent measurements performed by the movable device. Also, the movable device may use a threshold of a maximum number of positions of the movable device to be included in forming of the locally determined environment model in order to limit the processing power required for determining the locally determined environment model.

In one embodiment the method further comprises determining additional measurements relating to the one or more positions of the movable device, wherein said forming of the locally determined environment model defining at least estimated locations of the wireless transmission sources and estimated locations of the one or more positions of the movable device takes into account also an additional error of the locally determined environment model in relation to the determined additional measurements.

An advantage of supplying additional measurements is the extra information provided by the additional measurements thereby allowing better accuracy in the local environment model. The information of the additional measurements may be weighted by using a weighted contribution of the additional error such that e.g. the weight of an additional error may be set in relation to a reliability or accuracy of the additional measurement.

The additional measurements may be used in many different manners for allowing better accuracy in the local environment model. In one embodiment, if time instances of determining distance-dependent measurements are acquired, timing information may be used for forming additional errors or for eliminating outlier information. For instance, if a physically impossible jump in position of a movable device between two time instances is determined, such a position may be removed from consideration in forming of the locally determined environment model. Thus, filters may be used for removing outliers.

In one embodiment the additional measurements include at least one of: a position based on a satellite positioning system, sensor data indicating a relative floor in a building, compass data, accelerometer data, gyroscope data, step counter data, data correlating measurements at regular intervals, and manually input measurements.

Satellite position system measurements may be very accurate which may make the locally determined environment model more accurate. Sensor data such as e.g. floor data, compass data, accelerometer data, gyroscope data, step counter data may be acquired with little power consumption and may therefore be acquired often, giving rise to large amount of data which may make the locally determined environment model more accurate. The sensor data indicating a relative floor in the building may for instance be based on a pressure sensor measurement.

Data correlating measurements may identify a relationship between two or more variables which may make the locally determined environment model more accurate. Also, if sequential positions of the movable device are determined and the measurements are performed at regular intervals, a speed of movement may be relatively stable within the sequence of positions. By relating measurements in terms of determining a speed of the device, data may be obtained that indicates whether a position of the movable device is probable or not. For instance, a sudden very high peak in the speed of movement as modelled by the locally determined environment model may indicate an error in locating or positioning of the movable device.

Manual input may be received as additional measurements which may also be taken into account when forming the locally determined environment model. The manual input may be provided to the movable device through a human interface of the movable device. The manual input may for instance provide information of a floor in a building in which the movable device is located or information of manually determined location of the movable device or a wireless transmission source within the environment.

In one embodiment the method further comprises transmitting information of the distance-dependent measurements and/or information of estimated locations of wireless transmission sources and/or the locally determined environment model to the external unit.

The transmitted information may be e.g. data from distance-dependent measurements, sensor data indicating a relative floor in a building, compass data, accelerometer data, gyroscope data, step counter data, data correlating measurements, and manually input measurements. By transmitting such information, the movable device may benefit from the resources the external unit may have, such as e.g. larger computational power and better power supply, in constructing a model of the environment. The external unit may perform calculations for the movable device and distribute the result in the form of an updated centrally determined environment model. Furthermore, if several movable devices transmit information to the external unit it may enable the external unit to build a measurement data set which is larger than that of any individual movable device. The external unit may thereby be able to construct better models than individual devices. The individual movable devices may benefit from these better models in the form of updated centrally determined environment models.

In one embodiment the method further comprises intermittently receiving an updated centrally determined environment model from the external unit.

In this way the movable device may benefit from models held by the external unit. The models from the external unit may be more accurate than the models formed by the movable device due to larger resources, in terms of e.g. more computational power, better power supply, and larger measurement data sets, of the external unit. A change in the environment may be more easily detectable for some devices than for others. This change may then be relayed to all devices in the form of updated centrally determined environment models for the respective movable devices. For example, if a wireless transmission source is moved within a room it may be hard for movable devices outside the room to determine if the source has moved or if the propagation properties of the wall has changed (due to e.g. a new bookshelf). Measurement data from movable devices within the room may indicate that it is in fact the wireless transmission source that has moved. This information may help the external unit to form a better centrally determined environment model which can be distributed to movable devices outside the room. The movable devices are thereby in possession of a more accurate model, which they can subsequently build on through further modelling, earlier than if they had to perform the changes to the model themselves through measurements of their own.

In one embodiment the received centrally determined environment model represents a building and differentiates between wireless transmission sources on different floors of the building.

Modelling in a movable device may then account for floor penetration loss as the number of floors between the movable device and the wireless transmission source is known. It should also be realized that the model may estimate floor locations of the movable device and the wireless transmission sources, as the floor locations may not be exactly known, such that floor penetration loss may form an estimate of damping of signals between the movable device and the wireless transmission sources.

In one embodiment the received centrally determined environment model comprises identifiers of wireless transmission sources, wherein the identifiers are provided in a reduced format.

Identifiers for different wireless transmission sources may allow the movable device to identify to which wireless transmission source in the centrally determined environment model that a distance-dependent measurement relates to. Identifiers in a reduced format may take up less memory for the movable device and may thereby reduce the computational burden for the movable device. Also, the amount of data that needs to be communicated may be reduced so as to reduce power consumption due to communication between the movable device and the external unit. Furthermore, by providing identifiers in a reduced format, it may still be possible for the movable device to uniquely identify the wireless transmission sources within the environment in which the movable device is present.

For instance, the identifiers may be provided in the form of four last digits of identifiers of the wireless transmission sources, such as the final digits of a basic service set identifier (BSSID) which may be derived from the media access control (MAC) address of a WiFi router.

In one embodiment the received centrally determined environment model defines actual and/or estimated locations of wireless transmission sources in relation to a common reference point in the environment.

It may be less computationally demanding to perform the modelling when locations are expressed in the same coordinate system. A location expressed in relation to a reference point in the environment may require fewer bits than a location expressed in relation to a reference point outside the environment, or an absolute location. This may also imply that the amount of data that needs to be communicated may be reduced so as to reduce power consumption due to communication between the movable device and the external unit.

Further, using locations in relation to a common reference point may simplify calculations of distances between locations in the environment model, e.g. if the locations are expressed in meters in relation to the reference point rather than in latitude and longitude coordinates.

In one embodiment the received centrally determined environment model defines, for each wireless transmission source, a wireless transmission propagation model in the environment for wireless transmission from the source.

Propagation properties may differ from one source to another, depending on e.g. transmission power, mounting orientation and location, or the physical environment. Having a wireless transmission propagation model for each wireless transmission source may make the centrally determined environment model more accurate and thereby make the locating or positioning more accurate.

Also, when forming the locally determined environment model, the wireless propagation model for wireless transmission from the source may be updated, e.g by changing an RF damping coefficient. If distances to a wireless transmission source are determined which do not fit with the location of the wireless transmission source according to the environment model, the forming of the locally determined environment model may include determining whether the wireless propagation model for the wireless transmission from the source or the estimated location of the source is to be updated or if both are to be updated.

In one embodiment the received centrally determined environment model defines propagation properties of a building representing non-uniform structures, such as walls and or floors, in the building.

Propagation properties may depend on e.g. how many walls are between a source and a movable device. Having a wireless transmission propagation model representing non-uniform structures may make the centrally determined environment model more accurate and thereby make the locating or positioning more accurate.

Also, distance-dependent measurements may take propagation properties into account. For instance, if the distance-dependent measurement is based on a received power of a signal, i.e. a signal strength, as measured along a hallway, with no walls between the movable device and the wireless transmission source, a damping of the signal is small and the distance may be determined accordingly. On the other hand, if the distance-dependent measurement is based on a signal propagating through a wall, a damping of the signal is large and the distance may be determined accordingly. Thus, a direction (angle) along which the distance-dependent measurement is performed may be used together with information of propagation properties of the environment for determining a distance between the mobile device and the transmission source. The direction along which the distance-dependent measurement is performed may be determined by use of directed antennas in the movable device and/or the transmission source or may be determined by rough locating or positioning of the movable device based on distance-dependent measurements in relation to a plurality of wireless transmission sources.

According to another aspect of the present inventive concept there is provided a computer program product comprising a computer-readable medium storing computer-readable instructions which, when executed on a processing unit, will cause the processing unit to perform the method.

Effects and features of this second aspect are largely analogous to those described above in connection with the first aspect. Embodiments mentioned in relation to the first aspect are largely compatible with the second aspect.

Such a computer program product may thus provide a possibility to install and execute the program in order to obtain the above-discussed advantages of the method.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION OF THE PREFERRED EMBODIMENT

Figure 1:
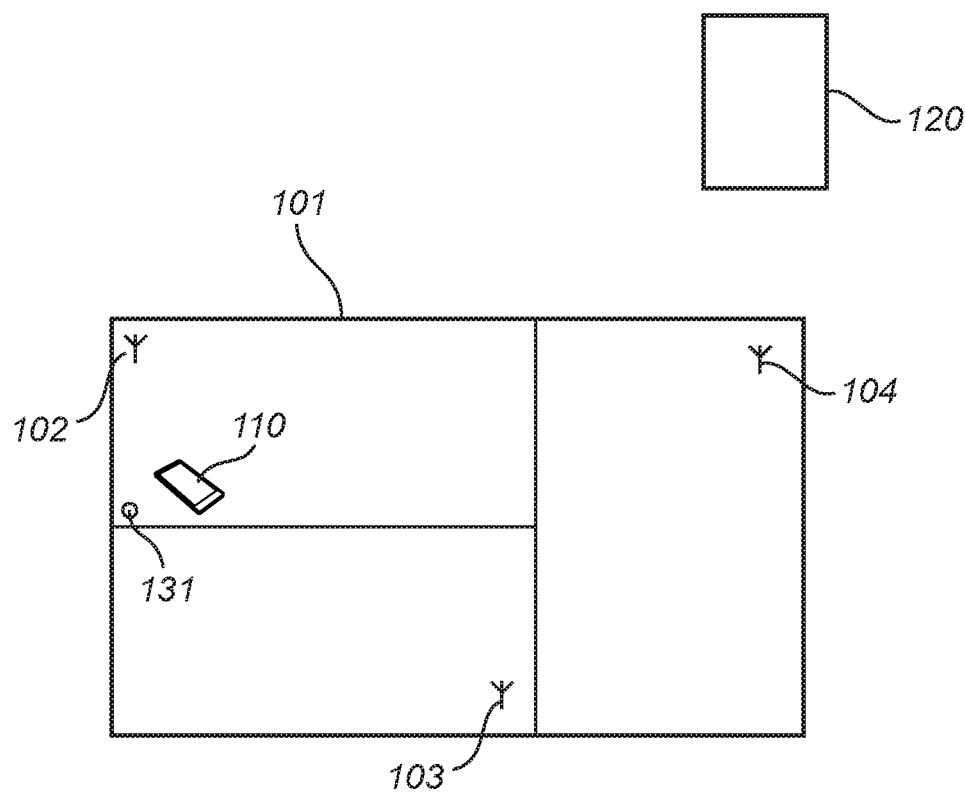
FIG. 1 is a schematic view of an environment illustrating locating or positioning of a movable device.

In cooperation with attached drawings, the technical contents and detailed description of the present invention are described hereinafter according to a preferable embodiment, being not used to limit the claimed scope. This invention may be embodied in many different forms and should not be construed as limited to the embodiments set forth herein; rather, these embodiments are provided for thoroughness and completeness, and fully convey the scope of the invention to the skilled person.

Indoor positioning systems (IPS) may use a variety of technologies for localizing a movable device within e.g. a building. Such techniques may be e.g. infrared (IR) radiation, ultrasound, radio-frequency identification (RFID), wireless local area network (WLAN) such as e.g. WiFi, Bluetooth, sensor networks, ultra-wideband (UWB), magnetic signals, vision analysis and audible sound. The IPS performs a number of measurements, using one or several of said technologies, and then tries to calculate a position of the movable device in relation to reference points based on the measurement data. Several measurements are generally needed in order to unambiguously position the movable device.

Radio frequency (RF) positioning techniques are of particular interest for IPS. Radio frequency wireless transmission sources, such as e.g. WiFi and Bluetooth sources, are frequent in indoor environments. A movable device may therefore use the wireless transmission sources to find its position without the need for further positioning infrastructure being deployed within the building. In some RF positioning techniques, the movable device estimates the distance to a number of different wireless transmission sources by performing distance dependent measurements. Based on the estimated distances the position of the movable device may be calculated through e.g. trilateration if the positions of the wireless transmission sources are known.

The distance to a wireless transmission source may be estimated through distance dependent measurements based on e.g. received signal strength indication (RSSI). RSSI is a measurement of the RF intensity received by the movable device which can be related to the distance through a RF indoor propagation model such as e.g.:

$$Prx(dBm) = Ptx(dBm@1m) - 10*\gamma*\log 10(d) - Pf(n) - N(s), \qquad \text{Eq. 1}$$

where

Prx(dBm) is the received signal power,

Ptx(dBm@ 1 m) is the transmitted power measured by the receiver at 1 m distance from the transmitter, $\gamma$ is the average RF damping factor, normally 2 for free space and between 1.5 and 6 for an indoor environment, d is the distance between transmitter and receiver in meters Pf(n) is an optional floor penetration loss factor n is number of floors between transmitter and receiver, and N is the random Gaussian noise with 0 mean and a standard deviation s.

The distance to a wireless transmission source may also be determined through time of flight measurements of signals between the transmitter and the receiver, also called round trip time (RTT) and fine timing measurements as being currently specified in new 802.11mc standard. Using time measurements of the time of flight for a transmission between a movable device and a wireless transmission source may allow for a more accurate distance estimate.

In general, an IPS requires some kind of mapping of the environment. As mentioned, the positions of the wireless transmission sources may need to be known for a trilateration calculation. Such mapping may act as a threshold for deploying an IPS as it costs time and money. Furthermore, it makes changes to the environment challenging since a new mapping may be required e.g. when a wireless transmission source is moved or a wireless transmission source is added or removed. Even adding, removing, or moving furniture may require a new mapping as it changes the propagation properties of the environment.

In a first embodiment of the invention, shown in FIG. 1, there is a single plane, 2D environment 101 with wireless transmission sources 102-104. The environment 101 is here assumed to be mostly indoor, but could be outdoor or indoor or a combination of the two. The wireless transmission sources 102-104 may be RF transmitters such as e.g. WiFi access points or Bluetooth low energy (BLE) beacons or a combination of different types of transmitters.

A movable device 110 is present in the environment 101. The movable device 110 has the ability to determine distance-dependent measurements relating to a distance between the movable device 110 and a wireless transmission source 102-104 for one or more positions 131 of the movable device 110. The movable device 110 may be e.g. a mobile phone, a package tracking device, a wearable device, or a domestic appliance. There may be several movable devices 110 within the same environment 101 and some movable devices 110 may also act as wireless transmission sources 102-104 themselves, as perceived by other movable devices 110. Examples of distance-dependent measurements may be a measurement based on a received power or signal strength, such as received signal strength indicator (RSSI) measurements, or a measurement based on propagation time of a signal, such as round trip time (RTT) measurements or time difference of arrival (TDOA) measurements. Combinations of different types of distance-dependent measurements are also possible.

An external unit 120 may communicate with the movable device 110 and support the movable device 110 in determining its location. The term external unit 120 indicates that it is external to the movable device 110, not that it necessarily is external to the environment 101. The external unit 120 may exist inside or outside the environment 101. The external unit 120 may communicate with the movable device 110 via the wireless transmission sources 102-104 or by other means such as e.g. the cellular network. In the present disclosure, the terms "external unit" and "central unit" are used interchangeably.

Figure 2:
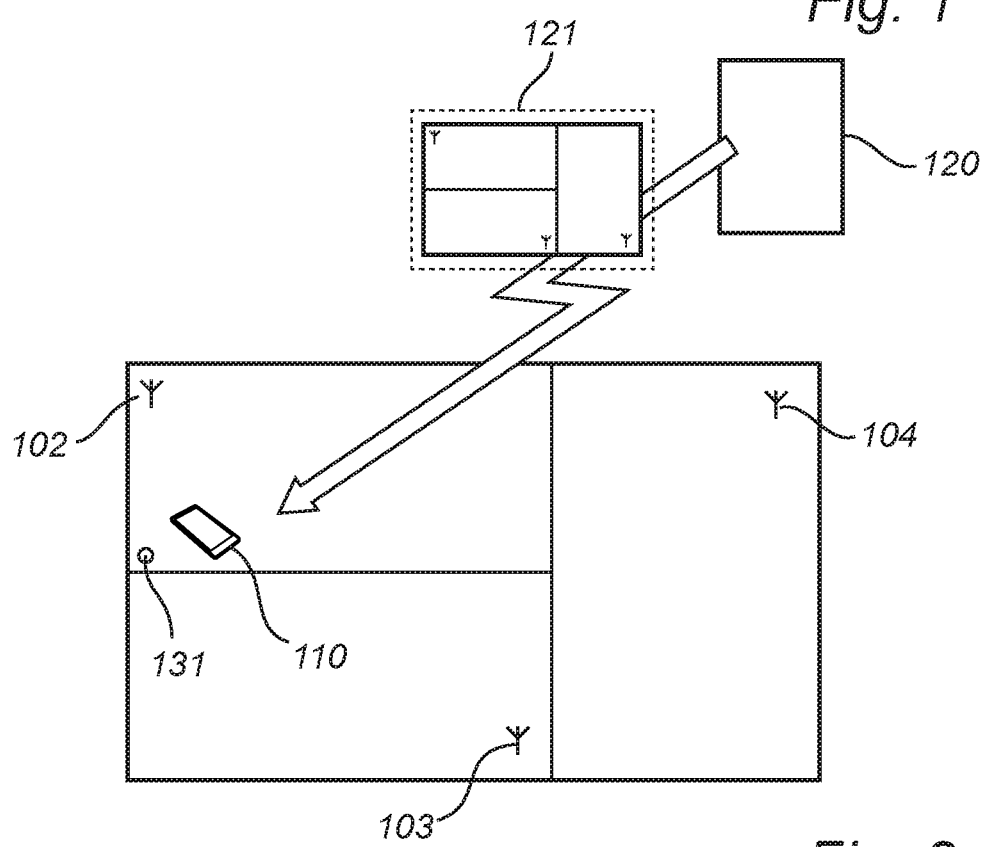
FIG. 2 is a schematic view illustrating communication of a central environment model from an external unit to the movable device.

FIG. 2 illustrates that the external unit 120 may support the movable device 110 in determining its location by providing information about the wireless transmission sources 102-104. Information about other aspects of the environment 101 may also be provided e.g. a wireless transmission propagation model for each wireless transmission source, information of location of structures in a building, such as floors, walls, stairs and elevators and information of signal damping by such structures. It should be realized that various different types of information of the environment 101 may be provided and that any information of the environment 101 may enable improved locating or positioning of the movable device 110 in the environment 101. The movable device 110 thus receives, from the external unit 120, a centrally determined environment model 121, the model at least defining actual and/or estimated locations of the wireless transmission sources 102-104. The centrally determined environment model 121 may not necessarily be completely accurate, as exemplified in FIG. 2, but may represent the latest or best model known to the external unit 120 and may thereby aid the movable device 110 in finding its position. The movable device 110 may subsequently refine the model according to the inventive concept.

Figure 3:
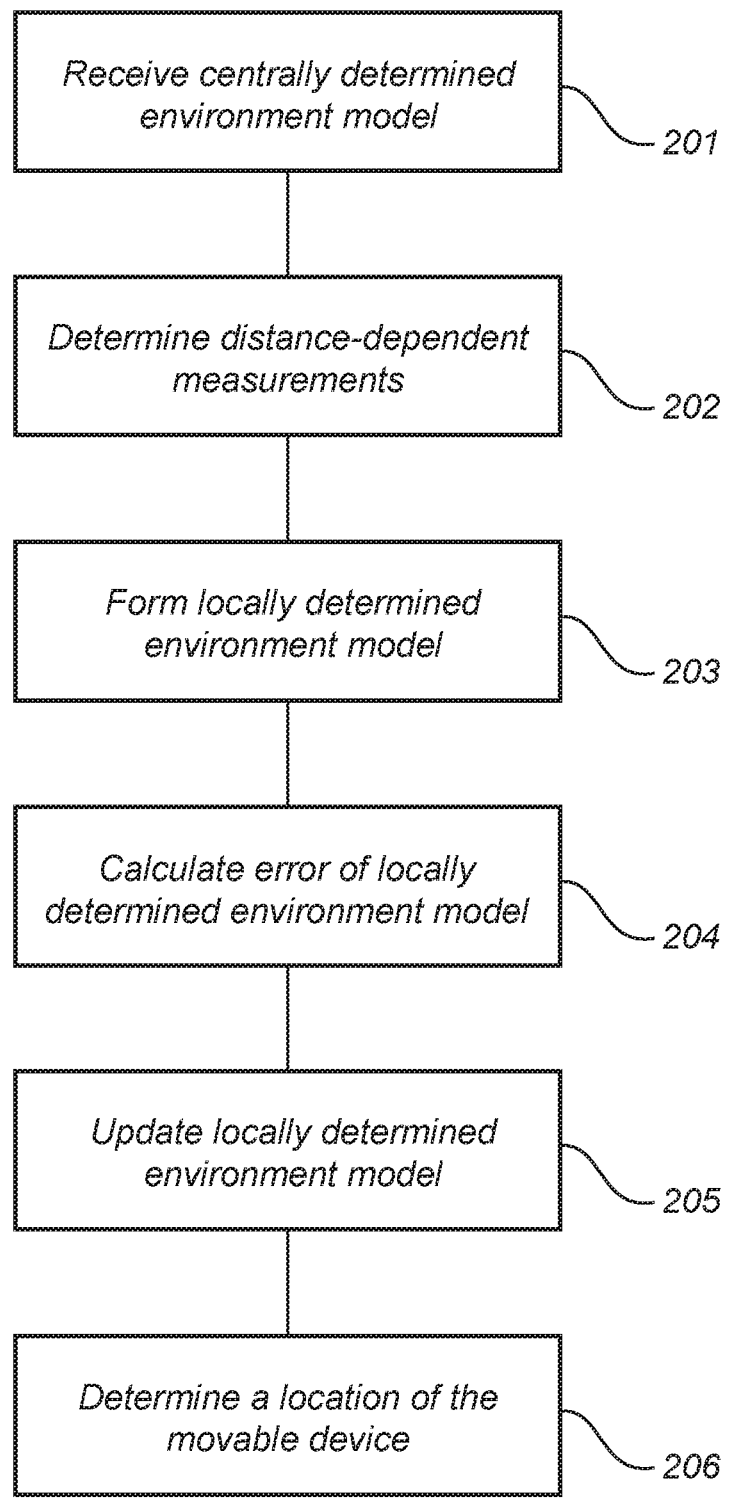
FIG. 3 is a flow chart of a method according to an embodiment.

FIG. 3. illustrates how the movable device 110 may determine its position according to the inventive concept. The movable device 110 receives 201 a centrally determined environment model 121. The movable device may initially form a locally determined environment model by storing the received centrally determined environment model 121 on the movable device 110. Thus, the locally determined environment model may initially be identical to the received centrally determined environment model 121. Then, the movable device 110 determines 202 distance-dependent measurements for one or more positions 131 of the movable device 110.

If the movable device 110 detects a wireless transmission source, which is not present in the centrally determined environment model 121 or detects that a wireless transmission source appears to no longer be present (no signal being detected from the wireless transmission source), a locally determined environment model 121 may be updated by adding or removing a wireless transmission source accordingly.

Further, in an embodiment, an update of the locally determined environment model may be formed 203 where source location parameters, representing the locations of the wireless transmission sources 102-104, and device location parameters, representing the locations of the one or more positions 131 of the movable device 110, are defined. The source location parameters may be defined by the estimated locations of the wireless transmission sources 102-104, received from the centrally determined environment model 121. The device location parameters may be initialized by other means; they can e.g. be set based on data stored on the movable device 110 such as previously calculated locations or even by making random guesses.

The locally determined environment model may subsequently be refined by fitting it to the measurement data in a data fitting process, using a fitting algorithm. Also, wireless transmission sources not present in the centrally determined environment model 121 may be added to the locally determined environment model and be included in the data fitting process. Similarly, wireless transmission sources may be removed from the centrally determined environment model 121. The fitting algorithm may perform the refinement iteratively. In the data fitting process, a number of fitting parameters may be modified. The fitting parameters may be the device location parameters and the source location parameters but can also be additional parameters, for example RF damping factor and/or wall locations. In each iteration a measurement data comparison may be performed, wherein the determined distance-dependent measurements may be compared with expected measurement outcomes assuming the current fitting parameters. A calculated error of the locally determined environment model may then be defined 204 based on the comparison. The locally determined environment model may subsequently be updated 205, wherein the fitting parameters are changed. The change may be based on the calculated error of the local environment model in the current and previous iterations. In an iterative refinement of the locally determined environment model step 204 and 205 may be repeated in sequence a number of times.

When the calculated error is reduced below a pre-set threshold, the iteration may be stopped and the locally determined environment model may be established. A pre-set maximum number of iterations may also be used to stop the calculations if there is a lack of convergence i.e. if the data does not fit the model well enough to reduce the calculated error below the pre-set threshold. In case the calculated error lies below the pre-set threshold already in the first locally determined environment model no further changes to the fitting parameters may be necessary.

Alternatively, the iterations may be stopped, when the data fitting process reaches a minimum. Thus, the data fitting process may be performed in order to find a locally determined environment model that best fits the fitting parameters to measurement data.

When the iteration is stopped the locally determined environment model contains estimated locations of the one or more positions 131 of the movable device 110 and updated estimated locations of the wireless transmission sources 102-104. The term updated refers to the estimated locations of the wireless transmission sources 102-104 being updated with respect to the centrally determined environment model 121. However, the term updated does not necessarily mean that the estimated locations of the wireless transmission sources 102-104 are changed with respect to the centrally determined environment model 121. It may be that the centrally determined environment model 121 represented a best fit and that no modifications were necessary. It may also be that some of the estimated locations of the wireless transmission sources 102-104 in the centrally determined environment model 121 were not fitted in the movable device 110, i.e. were not used as fitting parameters. A location of the movable device 110 may be determined 206 based on the estimated locations of the one or more positions 131 of the movable device 110. The determined location may be one of the estimated locations of the one or more positions 131 of the movable device 110 or a location based on an interpolation or extrapolation of the estimated locations of the one or more positions 131 of the movable device 110.

The centrally determined environment model 121 in the above description refers to the model coming from a central place, the external unit 120. It does not refer to the model necessarily being a model of a central environment. In a preferred embodiment the external unit 120 holds many models which may be relevant to several movable devices 110. It may e.g. have models for the wireless transmission sources 102-104 on all floors of a building. The external unit 120 may distribute centrally determined environment models 121 to different movable devices 110. These centrally determined environment models 121 do not necessarily need to be the same. In one embodiment the centrally determined environment model 121 distributed to a specific movable device 110 is a subset of models in the external unit 120. For example, the movable device 110 may receive a centrally determined environment model 121 which comprises a model of a building in which the movable device 110 is present, a model of the wireless transmission sources 102-104 on the floor the movable device 110 is currently on, or the current floor plus the one above and below.

The centrally determined environment model 121 may not only be a subset in a geographical sense. For example, the external unit 120 may hold wireless transmission propagation models for each wireless transmission source and distribute these to movable devices 110 which can handle more complicated calculations while simpler movable devices 110 may only receive a standardized propagation model for all sources.

In one embodiment the centrally determined environment model 121 further comprises estimated accuracies of the actual and/or estimated locations of the wireless transmission sources 102-104. The estimated accuracies may be given as a standard deviation for each actual and/or estimated location. The accuracy may be defined for all relevant dimensions, e.g. two horizontal dimensions and one vertical. The accuracy may also be defined as a single value representing e.g. an accuracy radius. The accuracy may not necessarily be the same in all dimensions. For example, the accuracy relating to the vertical dimension may be different from the accuracy relating to the horizontal dimensions. The centrally determined environment model 121 may also comprise estimated accuracies relating parameters which do not refer to locations, e.g. accuracies relating to parameters for wireless transmission propagation models. The estimated accuracies may be used by the fitting algorithm for choosing which changes should be made to the fitting parameters in the first iteration. The estimated accuracies may also be used in defining the calculated error.

Figure 4:
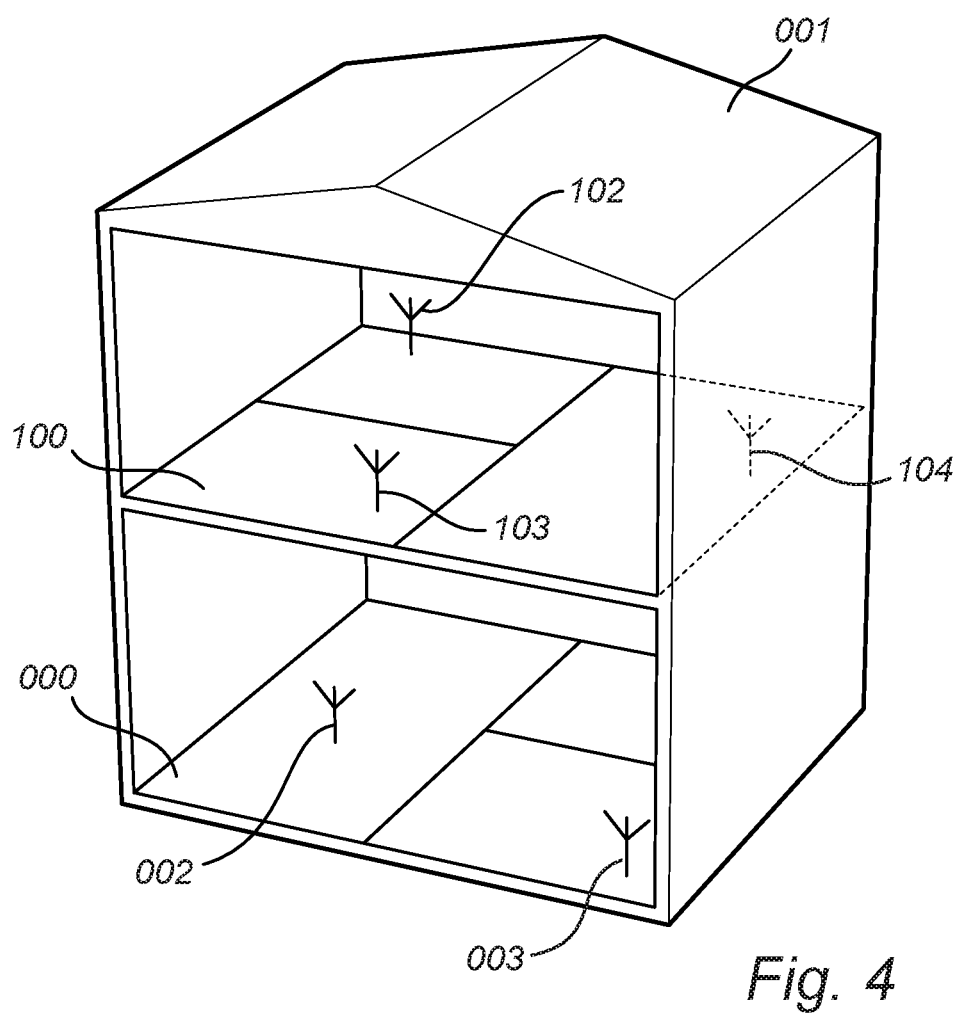
FIG. 4 is a schematic view of a three-dimensional environment.

FIG. 4 illustrates a 3D environment 001 representing a building with two floors, ground floor 000 and first floor 100. On the ground floor 000 there are wireless transmission sources 002-003 while on the first floor 100 there are wireless transmission sources 102-104. The inventive concept should not be considered limited to a 2D environment 101. Everything described in relation to a 2D environment 101 should be interpreted as applying to a 3D environment 001 as well.

In one embodiment the centrally determined environment model 121 represents a building and differentiates between wireless transmission sources 002-003, 102-104 on different floors of the building. The centrally determined environment model 121 may e.g. comprise an integer parameter for each wireless transmission source, wherein the integer represents the floor number. In the centrally determined environment model 121 sources on the floor 000 may e.g. have an indicator 0 indicating that they are situated on the ground floor while sources on floor 100 may have an indicator 1 indicating that they are situated on the first floor. The centrally determined environment model 121 may also comprise information of radio frequency damping between floors in the building.

In one embodiment the centrally determined environment model 121 comprises identifiers of wireless transmission sources 102-104, wherein the identifiers are provided in a reduced format. An example of an identifier may be the basic service set identifier (BSSID) derived from the media access control (MAC) address of a WiFi router. However, in order to limit the amount of data that needs to be communicated from the external unit 120 to the movable device 110, only part of the BSSID need to be transmitted, i.e. the identifier may be provided in a reduced format. By providing e.g. only the final digits of the BSSID, the movable device 110 may still be able to uniquely identify the wireless transmission sources 102-140 in the environment 101.

In one embodiment the centrally determined environment model 121 defines actual and/or estimated locations of wireless transmission sources 102-104 in relation to a common reference point in the environment 101. Such a reference point may e.g. be one of the corners on the ground floor of a building. Actual and/or estimated locations of wireless transmission sources 102-104 may then be given e.g. as a vector [x, y, z] where z either is a vertical distance or an integer value indicating a floor number and x,y are the horizontal coordinates within a floor relative to the reference corner. This may also allow limiting the amount of data that needs to be communicated from the external unit 120 to the movable device 110. The relative distance to the reference corner may be provided in a more condensed manner than if an absolute position, e.g. in longitude and latitude values is to be given.

In one embodiment the centrally determined environment model 121 defines, for each wireless transmission source, a wireless transmission propagation model in the environment 101 for wireless transmission from the source. For example, the centrally determined environment model 121 may define the propagation parameters Ptx(dBm@ 1 m) and γ for the wireless transmission sources 102-104. These propagation parameters may be inserted in Eq. 1 by the movable device 110 to ensure an accurate interpretation of the distance dependent measurements in the fitting process by the movable device 110. The propagation parameters may or may not be used as fitting parameters. If a movable device 110 does not receive a wireless transmission propagation model in the centrally determined environment model 121 it may use standardized propagation parameters.

In one embodiment the centrally determined environment model 121 defines propagation properties of a building representing non-uniform structures, such as walls or floors, in the building. For example, the central environment model 121 may define floor penetration loss factors like Pf(n) in Eq. 1. The centrally determined environment model 121 may also provide architectural plans for the building with penetration loss factors for individual walls and floors. Thus, in one embodiment, the propagation properties may be modelled according to the following equation:

$$Prx(dBm) = Ptx(dBm@1m) - 10*\gamma*\log 10(d) - Pf(n) - \Sigma Pw(m) - N(s),$$

where Pw(m) is an optional wall penetration loss factor and m is an identifier of a wall between the transmission source and the movable device 110.

The locally determined environment model in the above description refers to a model held locally on a movable device 110, not necessarily only representing a local area. The movable device 110 may, based on prior instructions or instructions given by the external unit 120, choose to include either the entire centrally determined environment model 121 or just a subset of the centrally determined environment model 121 into the local environment model. Furthermore, the movable device 110 may, based on prior instructions or instructions given by the external unit 120, choose which parameters in the locally determined environment model should be used as fitting parameters.

For example, in some situations a movable device 110 may have received wireless transmission propagation models and may have the capability to handle complex calculations but may not have enough measurement data to support a fit using fitting parameters relating to the wireless transmission propagation models. In this case the movable device 110 may include the wireless transmission propagation models in the fit in order to get more accurate results for e.g. the estimated location of the movable device 110 but does not fit the parameters for the wireless transmission propagation models.

The fitting of the locally determined environment model to the measurement data in the above description may be done by a bundle optimization. In the bundle optimization method, the calculated error may be a sum of residuals, e.g. squared residuals, wherein a residual may be the difference between a measured value, such as a determined distance-dependent measurement, and an expected value, for the measurement, provided by the model. In the bundle optimization, the sum of the squared residuals may be reduced by changing fitting parameters using the fitting algorithm.

The calculated error in the above description may be based on the residuals for the determined distance-dependent measurements. However, the calculated error may also comprise residuals for other measurements or other means for steering the fitting.

In one embodiment the calculated error of the locally determined environment model is based on a calculated weighted contribution of source location errors and distance-dependent errors. The distance-dependent errors may be the residuals for the distance-dependent measurements. The source location errors may be the difference between the source location parameters in the current iteration and the source location parameters received from the centrally determined environment model, i.e. a measurement of the distance the estimated locations of the wireless transmission sources 102-104 have moved compared the centrally determined environment model.

The weight for different source location errors may e.g. be set according to estimated accuracies of the estimated locations of the wireless transmission sources 102-104. Thus if the estimated location of a wireless transmission source has a high accuracy in the centrally determined environment model 121 it is harder for the fitting algorithm to move the location in the locally determined environment model than if the estimated location have had a low accuracy. In this manner a certain rigidity may be introduced to the locally determined environment model so that it does not stray too far off what is considered to be certain in the centrally determined environment model 121. Furthermore, it may save time and power for the movable device 110 by making it less likely for the fitting process to investigate local minima of the calculated error.

The updated locally determined environment model may comprise estimated accuracies of the estimated locations of the wireless transmission sources 102-104. It may also comprise estimated accuracies of the estimated locations of the one or more positions 131 of the movable device 110 as well as estimated accuracies of propagation properties or estimated accuracies of any fitting parameter. The estimated accuracies of the updated locally determined environment model may be explicitly output by the fitting algorithm but they can also be an implicit result of the fitting and not recorded. The estimated accuracies of the updated locally determined environment model may be improved by including more measurement data in the fitting.

Figure 5:
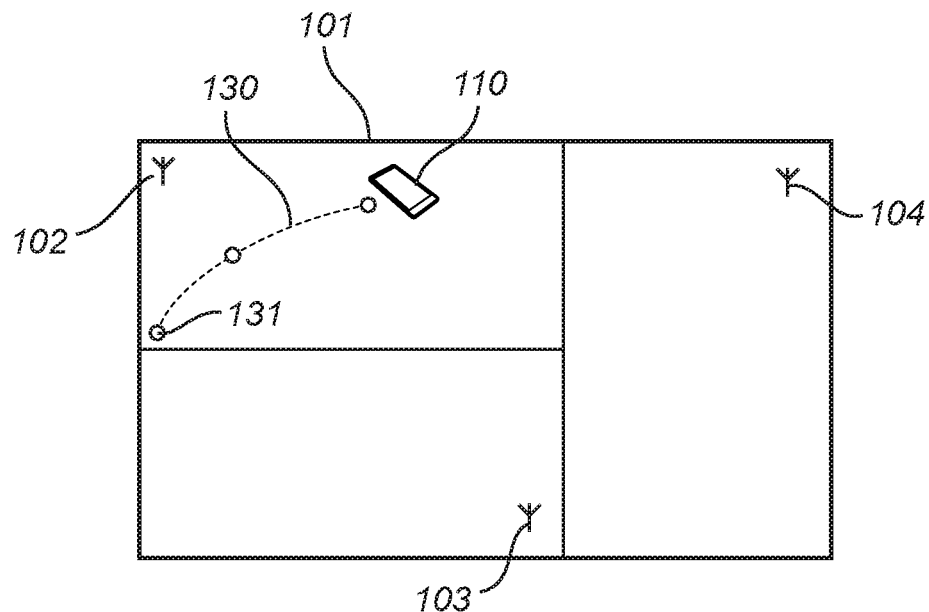
FIG. 5 is a schematic view of an environment illustrating movement of a movable device within the environment.

In one embodiment distance-dependent measurements are sequentially determined while the movable device 110 is moved in the environment 101. For example, the movable device 110 may record distance-dependent measurements at given time intervals. The movable device 110 may also comprise a sensor which detects movement and start recording distance-dependent measurements at given time intervals during the movement. FIG. 5 illustrates a movable device 110 which moves along a path 130 while performing distance-dependent measurements at the one or more positions 131 of the movable device 110. The measurement data from several of the one or more positions 131 of the movable device 110 may form a better basis for updating the locally determined environment model than the measurement data from just one of the one or more positions 131 of the movable device 110. Also, a probable relationship in space between the one or more positions 131 may be used as a fitting parameter in the bundle optimization. For instance, an error may be based on a position 131 of the movable device 110 not fitting into a likely path of the movable device 110.

In one embodiment the movable device 110, in addition to the distance-dependent measurements, also determines additional measurements relating to the one or more positions 131 of the movable device 110. Such measurements may be a position based on a satellite positioning system, sensor data indicating a relative floor in a building (through e.g. a pressure sensor), compass data, accelerometer data, gyroscope data, step counter data, data correlating measurements at regular intervals, and manually input measurements. The forming of the locally determined environment model of updated estimated locations of the wireless transmission sources 102-104 and estimated locations of the one or more positions 131 of the movable device 110 may subsequently take into account also an additional error of the locally determined environment model in relation to the determined additional measurements.

For example, distance-dependent measurements may be done at a fixed low sampling rate while accelerometer data and gyroscope data may be gathered continuously. When distance-dependent measurements have been made a data fitting process may be performed using the current distance-dependent measurement data as well as historical distance-dependent measurement data. The device location parameters for the current position may be initialized based on the estimated location of the movable device 110 from the last data fitting process, modified according to the movements indicated by the accelerometer data and gyroscope data. The data fitting process is then performed wherein the calculated error of the locally determined environment model accounts for both distance-dependent errors, source location errors and errors relating to additional measurements such as average direction of movement and average number of steps in the average direction since last data fitting process.

Figure 6:
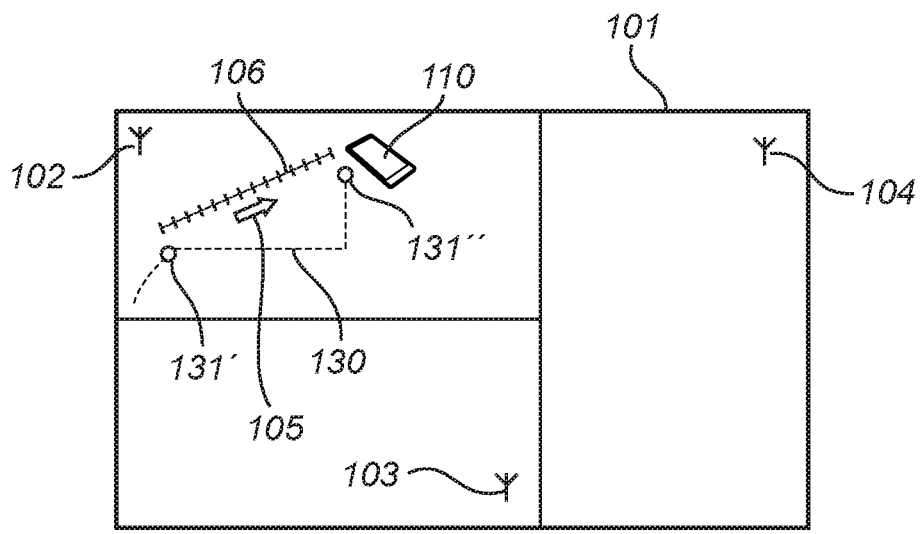
FIG. 6 is a schematic view of an environment illustrating acquiring information relating to a movement of the movable device.

FIG. 6 illustrates a mobile device 110 moving along a path 130 and determining distance-dependent measurement at positions 131' and 131". In-between positions 131' and 131" the movable device 110 performs additional measurements giving data on average direction of movement 105 and average number of steps of a person carrying the movable device 110 taken in the average direction 106. Thus, the additional measurements may provide an indication of a likely relation between positions 131' and 131".

Communication protocols between movable devices 110 and the external unit 120 may vary from one movable device 110 to another depending on communication capabilities such as e.g. remaining battery capacity.

In one embodiment the movable device 110 does not only receive information from the external unit 120, it also transmits information of the distance-dependent measurements to the external unit 120 through a movable device upload. Other data may also be transmitted to the external unit 120. Such data may e.g. be average direction of movement 105 and average number of steps taken in the average direction 106 since last mobile device upload, ambient air pressure and last GPS data. Further, the movable device 110 may transmit the locally determined environment model to the external unit 120 allowing the external unit 120 to receive the model as calculated by the movable device 110. Alternatively, the movable device 110 may merely transmit update information relating the locally determined environment model to the centrally determined environment model 121, such as large changes in position of a wireless transmission source 102-104.

The external unit 120 may also receive data from many different movable devices 110 so that the external unit 120 holds a larger set of measurement data than the individual movable devices. The large amount of measurement data and the possible large computational power on the external unit 120, in comparison to individual movable devices, may allow the external unit 120 to construct more accurate models than the movable devices. The movable devices may benefit from this process by receiving more accurate centrally determined environment models 121.

In one embodiment the movable device 110 intermittently receives an updated centrally determined environment model 121 from the external unit 120. This may happen at regular time intervals or irregularly.

The movable device 110 may e.g. request an updated centrally determined environment model 121 when it moves towards the geographical edge of its locally determined environment model or if the data fitting process does not converge. The external unit 120 may also send an updated centrally determined environment model without a request from the movable device 110.

For example, if the external unit 120 has indications of something changing in the environment 101 it may choose to send updated centrally determined environment models 121 to movable devices 110 within the environment 101.

Figure 7:
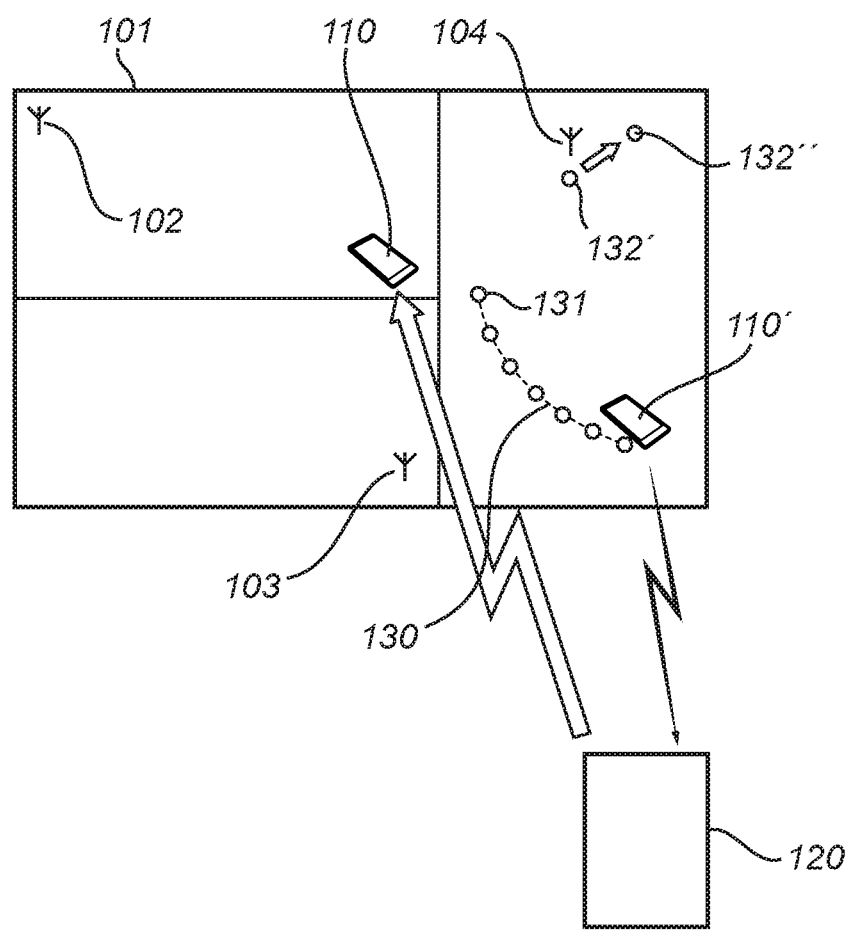
FIG. 7 is a schematic view of an environment illustrating movement of a wireless communication source in the environment.

FIG. 7 illustrates an example of one advantage of the movable devices 110 transmitting information of the distance-dependent measurements to the external unit 120 and receiving updated centrally determined environment models 121. A movable device 110 is currently not in motion when a wireless transmission source 104 is moved from wireless transmission source position 132' to 132". The movable device 110 may have difficulties determining if transmission source 104 has moved or if the transmission properties have changed. Measurement data from another movable device 110' moving along a path 130 while determining distance-dependent measurements at one or more positions 131 of the movable device 110' may indicate that it is in fact the wireless transmission source 104 that has moved. When the measurement data of movable device 110' is uploaded to the external unit 120 the external unit 120 may distribute an updated centrally determined environment model 121 to movable device 110.

According to another embodiment, the movable device 110 receives a centrally determined environment model 121 and performs positioning locally. Thus, the movable device 110 may provide a relatively accurate positioning without need of communication with the centrally determined environment model 121. At regular intervals, the movable device 110 communicates with the external unit 120 to receive a possibly updated centrally determined environment model 121. The movable device 110 may also upload distance-dependent measurements to the external unit 120 allowing the external unit 120 to perform a more rigorous and computation-demanding determination of the position of the movable device 110, such that the movable device 110 may receive indications of its position, which may have been more accurately determined in the external unit 120.

Hence, the positioning performed in the movable device 110 may provide relatively accurate positions in-between receipt of very accurate positions from the external unit 120. Thus, the movable device 110 may be able to position itself in a relatively accurate manner and may receive information for very accurate positioning at regular intervals. This enables positioning the movable device 110 while limiting communication needed between the movable device 110 and the external unit 120.

For instance, the movable device 110 may determine its position every 10 seconds and may receive updated information from the external unit 120 every 1 minute. However, in order to reduce communication between the movable device 110 and the external unit 120, the updated information may be received much less frequently. For instance, for a simple device which has limited battery capacity, limited communication may be needed. Further, such a simple device may be relatively stationary and may thus not need to determine its position with great accuracy. Thus, the updated information from the external unit 120 may for instance be received every 10 minutes, every 1 hour or even just once a day.

In one embodiment of the invention a computer program product is used for implementing the positioning method of the movable device 110. The computer program product comprises a computer-readable medium storing computer-readable instructions which, when executed on a processing unit, will cause the processing unit to perform the method according to the inventive concept.

The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer program product additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

In the above the inventive concept has mainly been described with reference to a limited number of examples. However, as is readily appreciated by a person skilled in the art, other examples than the ones disclosed above are equally possible within the scope of the inventive concept, as defined by the appended claims.

What is claimed is:

1. A method for locating a movable device within an environment, wherein the movable device is configured for wireless communication, said method comprising:
   receiving by the movable device a centrally determined environment model from an external unit, the received centrally determined environment model defining at least locations of wireless transmission sources and defining estimated accuracies of the locations of the wireless transmission sources, the estimated accuracies comprising deviations of at least one spatial dimension of the locations of the wireless transmission sources;
   determining distance-dependent measurements for one or more locations of the movable device, wherein each of the determined distance-dependent measurements provides measured wireless signal information relating to a distance between the movable device and a wireless transmission source; and
   determining a location of the movable device based on the received centrally determined environment model and the determined distance-dependent measurements for one or more locations of the movable device, said determining comprising:
      forming in the movable device a locally determined environment model, the locally determined environment model being updated in relation to the received centrally determined environment model and defining at least the locations of the wireless transmission sources and the one or more locations of the movable device, wherein a calculated error comprising differences between (a) expected distance-dependent measurements and (b) the determined distance-dependent measurements, is reduced in updating the locally determined environment model, and wherein estimated accuracies are taken into account in the calculated error.

2. The method according to claim 1, wherein the received centrally determined environment model further comprises estimated accuracies of the actual and/or estimated locations of the wireless transmission sources.

3. The method according to claim 1, wherein the received centrally determined environment model is a subset of one or more models in the external unit.

4. The method according to claim 1, wherein the calculated error of the locally determined environment model is based on a calculated weighted contribution of errors, wherein each error is based on a difference between a feature defined by the locally determined environment model and a corresponding measurement.

5. The method according to claim 1, wherein the received centrally determined environment model defines, for each wireless transmission source, a wireless transmission propagation model in the environment for wireless transmission from the source.

6. The method according to claim 1, wherein the received centrally determined environment model defines propagation properties of a building representing non-uniform structures in the building.

7. The method according to claim 1, wherein the determined distance-dependent measurements are sequentially determined for a plurality of locations of the movable device while the movable device is moved in the environment, wherein the forming of the locally determined environment model is based on the determined distance-dependent measurements for a defined number of most recent locations among the plurality of locations.

8. The method according to claim 1, further comprising determining additional measurements relating to the one or more locations of the movable device, wherein the forming of the locally determined environment model defining at least estimated locations of the wireless transmission sources and estimated locations of the one or more locations of the movable device takes into account also an additional error of the locally determined environment model in relation to the determined additional measurements.

9. The method according to claim 8, wherein the determined additional measurements include at least one of: a position based on a satellite positioning system, sensor data indicating a relative floor in a building, compass data, accelerometer data, gyroscope data, step counter data, data correlating measurements at regular intervals, and manually input measurements.

10. The method according to claim 1, further comprising transmitting information of the determined distance-dependent measurements and/or information of estimated locations of wireless transmission sources and/or the locally determined environment model to the external unit.

11. The method according to claim 1, further comprising intermittently receiving an updated centrally determined environment model from the external unit.

12. The method according to claim 1, wherein the received centrally determined environment model represents a building and differentiates between wireless transmission sources on different floors of the building.

13. The method according to claim 1, wherein the received centrally determined environment model comprises identifiers of wireless transmission sources, wherein the identifiers are provided in a reduced format.

14. The method according to claim 1, wherein the received centrally determined environment model defines actual and/or estimated locations of wireless transmission sources in relation to a common reference point in the environment.

15. A computer program product comprising a non-transitory computer-readable medium storing computer-readable instructions which, when executed on a processing unit, causes the processing unit to perform a method for locating a movable device within an environment, wherein the movable device is configured for wireless communication, said method comprising:

receiving by the movable device a centrally determined environment model from an external unit, the received centrally determined environment model defining at least locations of wireless transmission sources and defining estimated accuracies of the locations of the wireless transmission sources, the estimated accuracies comprising deviations of at least one spatial dimension of the locations of the wireless transmission sources;

determining distance-dependent measurements for one or more locations of the movable device, wherein each of the determined distance-dependent measurements provides measured wireless signal information relating to a distance between the movable device and a wireless transmission source; and determining a location of the movable device based on the received centrally determined environment model and the determined distance-dependent measurements for one or more locations of the movable device, said determining comprising:

forming in the movable device a locally determined environment model, the locally determined environment model being updated in relation to the received centrally determined environment model and defining at least the locations of the wireless transmission sources and the one or more locations of the movable device, wherein a calculated error comprising differences between (a) expected distance-dependent measurements and (b) the determined distance-dependent measurements, is reduced in updating the locally determined environment model, and wherein estimated accuracies are taken into account in the calculated error.

\* \* \* \* \*